Dec. 9, 1947.  F. J. SCHULTHEIS  2,432,489
FOLDABLE BABY CARRIAGE FRAME
Filed July 6, 1945  3 Sheets-Sheet 1
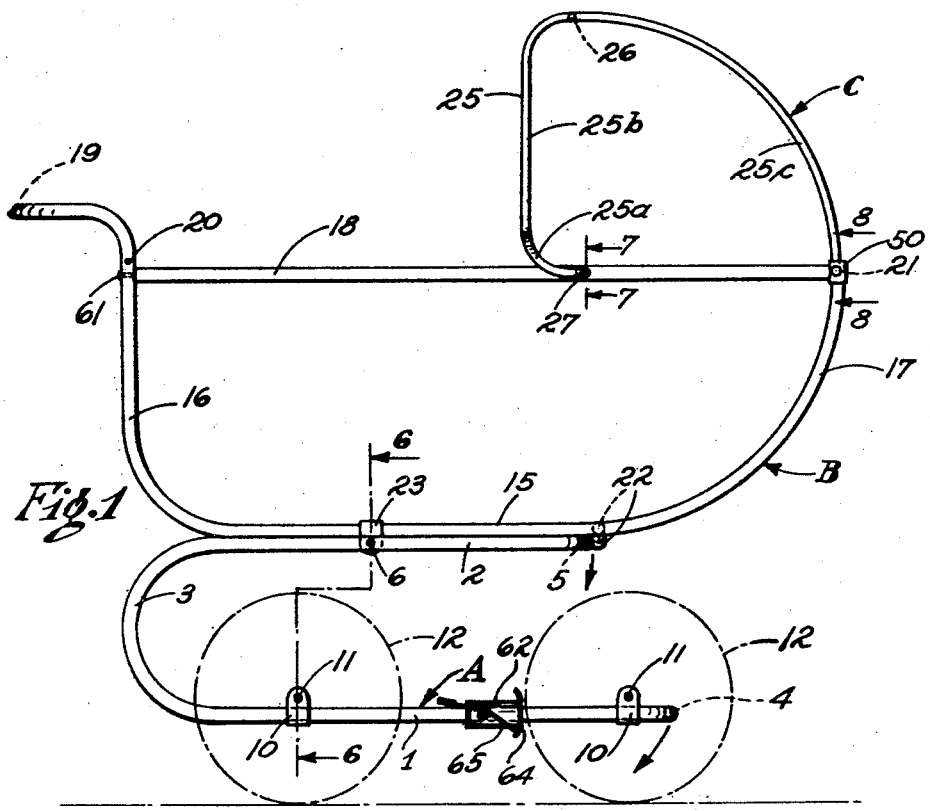
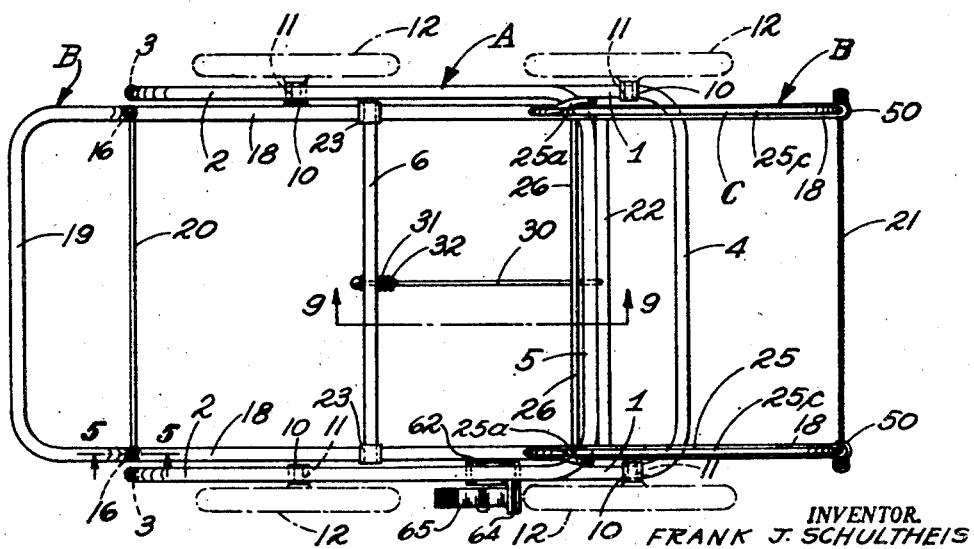
INVENTOR.
FRANK J. SCHULTHEIS
BY
Richey & Watts
ATTORNEYS Dec. 9, 1947.   F. J. SCHULTHEIS   2,432,489
FOLDABLE BABY CARRIAGE FRAME
Filed July 6, 1945   3 Sheets-Sheet 2
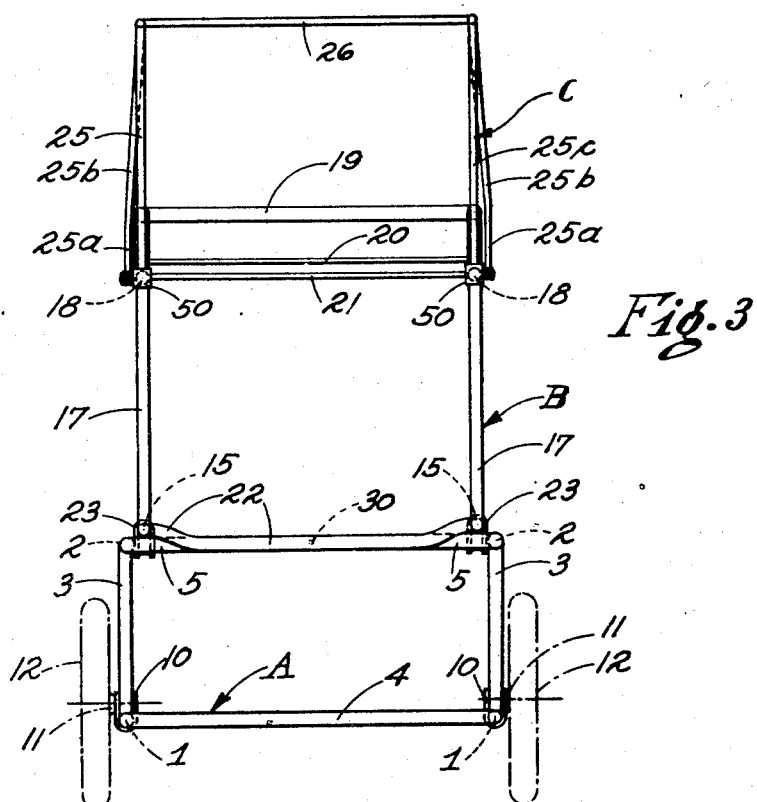
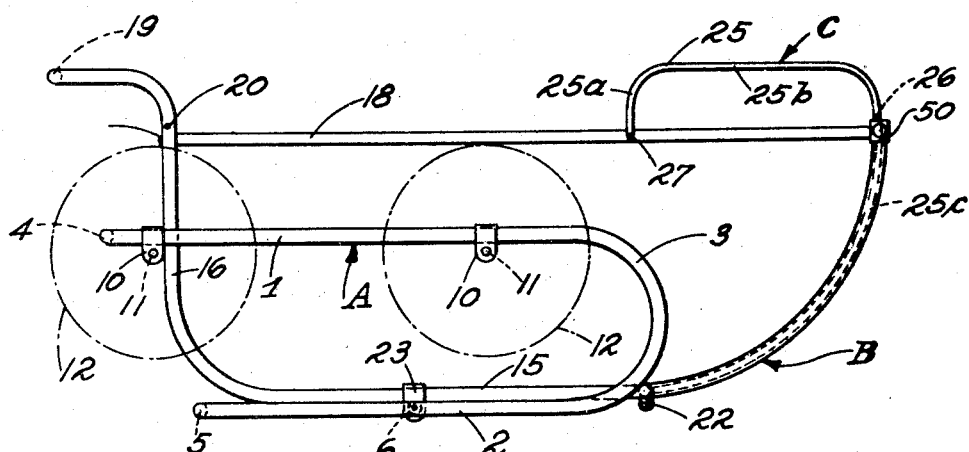
INVENTOR.
FRANK J. SCHULTHEIS
BY
Richey & Watts
ATTORNEYS Dec. 9, 1947.  F. J. SCHULTHEIS  2,432,489
FOLDABLE BABY CARRIAGE FRAME
Filed July 6, 1945  3 Sheets-Sheet 3
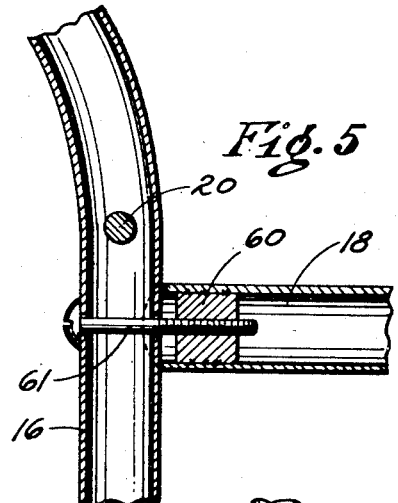
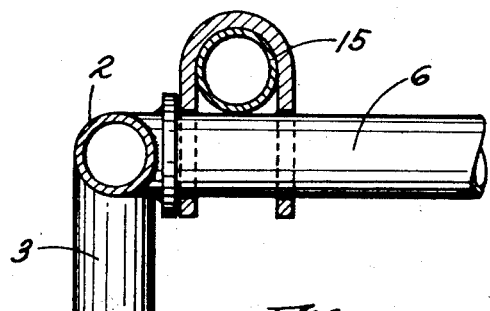
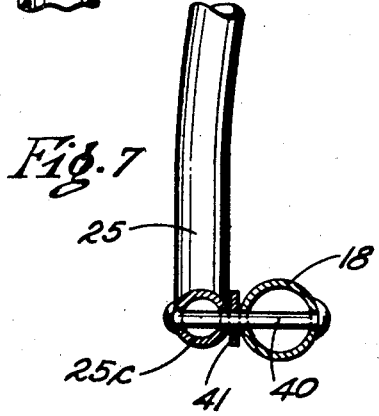
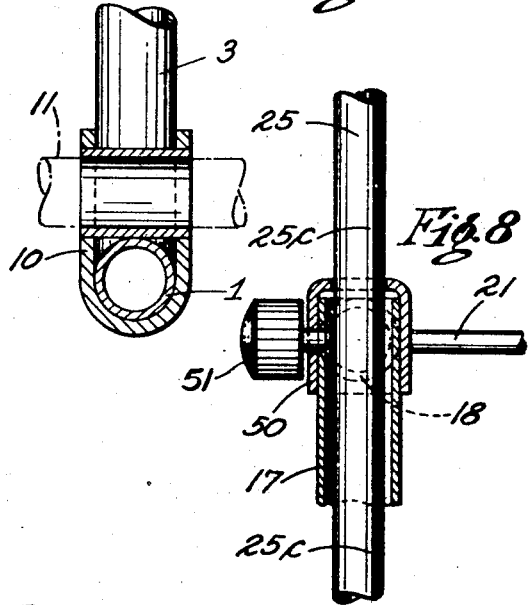
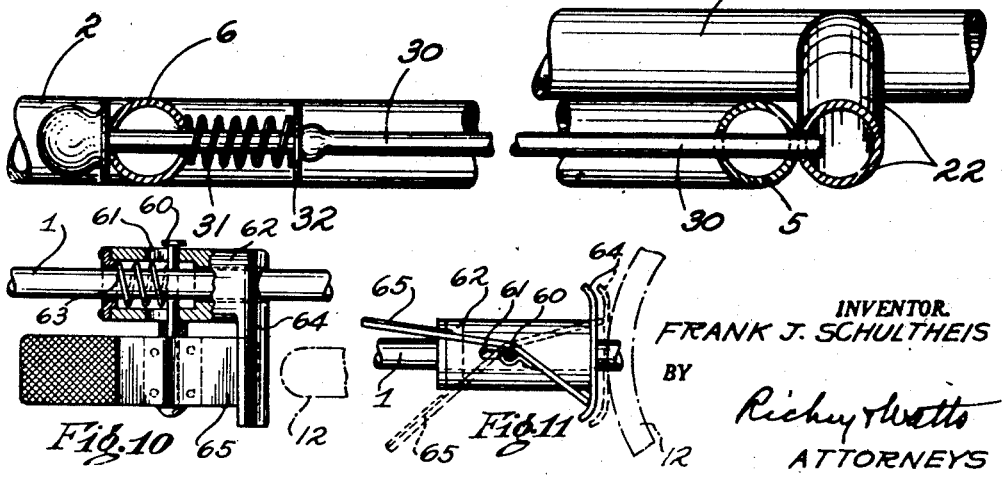
INVENTOR.
FRANK J. SCHULTHEIS
BY
Richey Watts
ATTORNEYS Patented Dec. 9, 1947

2,432,489

UNITED STATES PATENT OFFICE 2,432,489

FOLDABLE BABY CARRIAGE FRAME

Frank J. Schultheis, Lakewood, Ohio, assignor to Republic Steel Corporation, Cleveland, Ohio, a corporation of New Jersey Application July 6, 1945, Serial No. 603,479

7 Claims. (Cl. 280—36)

The present invention relates generally to collapsible vehicles, and particularly provides a metal baby carriage frame which can be collapsed into compact, readily carriable form, which may be used as a bassinet, if desired.

The present invention will be better understood from the following description and the drawings which accompany and form a part of this specification and in which Fig. 1 is a side elevational view of the framework of a baby carriage embodying one form of the present invention;

Fig. 2 is a top plan view of the apparatus of Fig. 1;

Fig. 3 is an end view taken from the righthand end of Fig. 1;

Fig. 4 is a view similar to Fig. 1 but showing the apparatus of that figure in collapsed condition;

Fig. 5 is a detail sectional view taken on line 5—5 of Fig. 2;

Fig. 6 is a detail sectional view taken on line 6—6 of Fig. 1;

Fig. 7 is a fragmentary sectional view taken on line 7—7 of Fig. 1;

Fig. 8 is a sectional view taken on line 8—8 of Fig. 1;

Fig. 9 is a sectional view taken on line 9—9 of Fig. 2;

Fig. 10 is a plan view, partly in section, of a brake; and,

Fig. 11 is a side elevational view of the brake.

The device shown in Figs. 1 to 4 inclusive is a baby carriage which consists primarily of metal tubing and comprises a wheel frame and a body frame, a pivotal connection between the two frames so that they may be moved from their extended position to a collapsed position and vice versa, and means for locking the frames in their extended position.

The wheel frame, designated generally by A may be said to comprise a rectangle composed of tubing which has been bent intermediate its ends into a U-shape. Otherwise viewed, the wheel frame may be said to comprise horizontally spaced vertical side members each having upper and lower legs connected at one end thereof and transverse horizontal members connecting the other ends of said upper and lower members. Each such side member comprises a lower leg 1 and an upper leg 2, corresponding ends of these legs being connected by curved member 3. These two side members are connected by lower transverse member 4 and upper transverse member 5. The two spaced side members are also connected by a transverse pivot member 6. As stated above, the members 1 to 5 may be considered as constituting a rectangle which has been bent intermediate its ends into a U-shape.

Preferably, members 1 to 6 are composed of metal tubing. It will be understood that the members 3 which connect the upper and lower legs 1 and 2 of the frame permit springing action of the upper and lower members 1 and 2 toward and away from each other and thus provide resiliency and free riding qualities for the body frame of the carriage. If desired, a single piece of tubing may be bent to form members 1 to 5 with the ends of the tubing welded or otherwise connected together and with transverse tube 6 similarly connected at its ends to members 2. Alternatively, several pieces of tubing may be connected together to form the wheel frame comprising members 1 to 6 inclusive.

The lower legs 1 of the wheel frame are provided with brackets 10, each carrying an axle 11 on which a wheel 12 is rotatably mounted.

The body frame, designated generally by B, may be said to comprise horizontally spaced, vertical side members each consisting of a lower horizontal member 15 having upwardly extending arms 16 and 17 and an upper horizontal member 18 attached at its ends to arms 16 and 17. These two side members are connected together by a transverse handle 19, transverse tie rod 20 extending between arms 16 near handle 19 and horizontal tie rod 21 at the upper end of arms 17, and transverse tube member 22 which is beside member 5 of the wheel frame when the frames are in their extended position. Preferably, arms 16 are substantially vertical and arms 17 are bent on a uniform curve. The members 15 of body frame B carry brackets 23 thru which transverse members 6 of wheel frame A loosely extend. Brackets 23 and tube 6 form pivotal connections between the wheel and body frames.

Means are provided for maintaining the wheel and body frames in extended position. This means, as shown in Fig. 9, comprises a rod 30 which extends thru members 5 and 6 of the wheel frame and into transverse member 22 of the body frame, when the frames are in their extended position. Rod 30 is urged toward member 22 by spring 31 which surrounds the rod and pressed at one end against member 6 and at the other end against a stop 32 connected to rod 30.

A top or hood designated generally at C comprises spaced vertical side members 25 pivoted at one end to members 18 and at the other end extending into the upper ends of arms 17, and a transverse connecting member 26. Each side member of top C comprises a short horizontal portion 25a pivoted to members 18 at 27, a vertical portion 25b at substantially right angles to portion 25a and a curved portion 25c extending into 25b. The horizontal distance from pivots 27 to the vertical portion 25b is substantially the same as the vertical distance between body frame members 18 and handle 19. The vertical distance from pivot 27 to the top end of portion 25b is approximately the same as the horizontal distance from pivots 27 to arms 17. The portion 25c is curved on the same radius as that of arms 17 so that when top C is turned about pivots 26 the curved portions 25c will telescope in arms 17 and the straight portions 25b will be substantially horizontal in the plane of handle 19.

As is better shown in Fig. 7, the pivotal connection between the body frame and the top frame comprises a pivot pin 40 which extends thru the top member 25 and thru horizontal frame member 18 to which it is welded. A washer 41 interposed between members 25 and 18 permits free pivoting action of the top relative to the body frame.

The top C is made adjustable as shown in Fig. 8. Fittings 50 are secured at the upper ends of arms 17, are attached to tie rod 21 and are open at the upper ends to receive member 25. Screws 51 have screw threaded engagement in fittings 50 and may bear against top members 25 and thereby hold the top in adjusted position.

Since the body frame is somewhat narrower in width than the wheel frame and the body frame is in effect disposed between the opposed sides of the wheel frame, the latter frame may be turned about the center line of member 6 from the extended position shown in Fig. 1 to the collapsed position shown in Fig. 4. When the top C and wheel frame B have been pivoted and collapsed as above described and shown in Fig. 4, the carriage will be compact, will not occupy much space, and may be carried readily.

In Fig. 5 is shown one form of means for securing frame side member 18 to arm 16. In this instance member 18 has a plug 60 secured therein. This plug is threaded to receive a screw 61 which extends thru member 16 and into plug 60.

It will be understood from the foregoing description that the entire carriage frame may be composed of light weight metal parts that the body frame is springily supported by reason of the curved members 3, and that when collapsed the carriage forms a compact article which is easy to carry or pack, and may serve as a bassinet.

Figs. 1, 2, 10 and 11 show a form of brake which may be employed. A bolt 60 extends thru holes in one lower leg 1 of the wheel frame, and thru slots 61 in a sleeve 62 which surrounds and is slidable axially on leg 1. Spring 63 is coiled about leg 1 inside of sleeve 62 and presses against bolt 60 and the closed end of the sleeve, thereby urging it to the left (Figs. 10 and 11). Sleeve 62 carries a laterally projecting brake arm 64 which extends outwardly beyond the adjacent wheel 12. Lever 65 is rotatably mounted on bolt 60. When lever 65 is in the full line position of Fig. 11, the downwardly extending arm of the lever permits spring 63 to maintain the sleeve in position at one end of its stroke with arm 64 out of contact with the tread of wheel 12. When lever 65 is rotated about bolt 60 to the dotted line position of Fig. 11 the lever advances arm 64 into braking contact with wheel 12 and locks it in that position. When lever 65 is rotated to the full line position spring 63 retracts the arm.

Having thus described my invention so that others skilled in the art may be able to understand and practice the same, I state that what I desire to secure by Letters Patent is defined in what is claimed.

What is claimed is:

1. A collapsible vehicle comprising a body frame, a wheel frame including a transverse member, opposed pairs of vehicle supporting wheels rotatably connected to said wheel frame pivot means connecting the wheel frame to the body frame for permitting telescopic positioning of the two frames, said frames being composed of metal tubing, and means on the wheel frame cooperating with said transverse member for locking the two frames in their extended position.

2. A collapsible vehicle comprising a body frame, a wheel frame and a top frame, said frames being composed of metal tubing, means connecting the wheel frame to the body frame, parts of the top frame tubing extending telescopically into parts of the body frame tubing, and pivot means connecting the body frame and the top frame for permitting telescopic positioning of the body and top frames.

3. A collapsible vehicle comprising a body frame, including spaced vertical sides and transversely extending connecting members, a wheel frame comprising sides outside of the body frame, pivot means connecting the top of the wheel frame to the bottom of the body frame for permitting telescopic positioning of the said frames, said frames being composed of metal tubing, and means extending thru one of said transversely extending members and into another of said members for locking the two frames in their extended position.

4. A collapsible vehicle comprising a body frame, including vertical sides and transverse connecting means, a wheel frame including vertical sides disposed outside of and below said frame and transverse connecting members, pivot means connecting a transverse connecting member of the wheel frame to the sides of the body frame for permitting telescopic positioning of the two frames, and latch means on the said transverse member of the wheel frame cooperating with a transverse connecting means of the body frame for locking the two frames in their extended position.

5. A collapsible vehicle comprising a body frame, a wheel frame including transversely connected sides each consisting of an upper leg, a lower leg and a curved connection between said legs, pivot means connecting the top of the wheel frame to the bottom of the body frame for permitting telescopic positioning of the said frames, and means on the wheel frame cooperating with the body frame for locking the two frames in their extended position.

6. A collapsible vehicle comprising a body frame composed of horizontally spaced vertical sides and transverse members connecting said sides, a wheel frame composed of vertical sides disposed on opposite sides of said body frame and transverse members connecting said sides below said body frame, brackets connected to one of said transverse members of said body frame and loosely encircling one of said transverse members of said wheel frame for telescopic pivoted movement of the two frames, and means carried by one of the transverse members of the wheel frame and insertible in one of the transverse adjacent members of said body frame for locking the two frames in their extended position.

7. A collapsible vehicle comprising a body frame, a wheel frame and a top frame, said frames being composed of metal tubing, means connecting the wheel frame to the body frame, pivot means connecting the top frame to the body frame, the body frame having tubular portions at one end thereof curved on the arc of a circle and open at their upper ends, said top frame including tubular portions curved on an arc of the same circle and extending into the said curved portions of the body frame.

FRANK J. SCHULTHEIS.

REFERENCES CITED

The following references are of record in the file of this patent:

UNITED STATES PATENTS

| Number | Name | Date |
|---|---|---|
| 554,685 | Hartson | Feb. 18, 1896 |
| 1,091,025 | Spofford | Mar. 24, 1914 |

FOREIGN PATENTS

| Number | Country | Date |
|---|---|---|
| 456,930 | France | Sept. 8, 1913 |